(12) United States Patent  (10) Patent No.: US 7,533,562 B2
Lifvenborg  (45) Date of Patent: May 19, 2009

(54) DEVICE FOR PRESSURE MEASUREMENT

(75) Inventor: Ulf A. Lifvenborg, Vasteras (SE)

(73) Assignee: ABB AB (SE)

( * ) Notice: Subject to any disclaimer, the term of this patent is extended or adjusted under 35 U.S.C. 154(b) by 0 days.

(21) Appl. No.: 12/029,536

(22) Filed: Feb. 12, 2008

(65) Prior Publication Data

US 2008/0196513 A1  Aug. 21, 2008

Related U.S. Application Data

(63) Continuation of application No. PCT/SE2006/000974, filed on Aug. 25, 2006.

(30) Foreign Application Priority Data

Sep. 5, 2005  (SE) .................................... 0501957

(51) Int. Cl.
*G01M 15/08* (2006.01)
(52) U.S. Cl. .................. 73/114.16; 73/114.18
(58) Field of Classification Search .............. 73/114.16, 73/114.18, 114.21
See application file for complete search history.

(56) References Cited

U.S. PATENT DOCUMENTS 3,648,524 A  3/1972  Dahle 4,193,294 A * 3/1980 Forslund et al. .......... 73/862.69
4,227,403 A * 10/1980 Dooley et al. ............. 73/114.21
4,408,496 A * 10/1983 Dahle et al. .................... 73/728

FOREIGN PATENT DOCUMENTS

EP  1189050 A1  3/2002
WO  9958945 A1  11/1999

OTHER PUBLICATIONS

International Search Report, Dec. 11, 2006, 3 pages.

* cited by examiner

*Primary Examiner*—Andre J Allen
(74) *Attorney, Agent, or Firm*—St. Onge Steward Johnston & Reens LLC

(57) ABSTRACT

A device for measuring the pressure in a gas, wherein the device comprises: a framework, a channel extending through the framework, the channel comprising in the axial direction a introductory section including an opening for receiving the gas, a measuring section having a wall, and a final section, the end of which is closed during measuring, measuring units for measuring radial forces acting on the wall of the measuring section, the measuring unit comprising a measuring body standing in mechanical contact with a first portion of the wall of the measuring section, a cooling body for transporting heat from the walls of the measuring section to the framework, wherein the cooling body is standing in thermal contact with a second portion of the wall of the measuring section and with the framework.

21 Claims, 4 Drawing Sheets

DEVICE FOR PRESSURE MEASUREMENT

CROSS-REFERENCE TO RELATED APPLICATIONS

The present application is a continuation of pending International patent application PCT/SE2006/000974, filed Aug. 25, 2006 which designates the United States and claims priority from Swedish patent application 0501957-5 filed on Sep. 5, 2005, the content of which is incorporated herein by reference.

FIELD OF THE INVENTION

The present invention relates to a device for measuring the pressure in a gas. The device according to the invention is, for example, suitable for measuring gas pressure inside a cylinder of a combustion engine. The invention is particularly suitable for measuring gas pressure in large diesel engines. Such engines are used, for example, as ship engines and as stationary engines for driving electrical generators and gas compressors.

BACKGROUND OF THE INVENTION

With growing demands for reduced fuel consumption and increasing environmental demands on the chemical composition of the exhaust gases, the requirement to monitor the operation of combustion engines has increased. Misfiring influences exhaust gas chemical composition and can also negatively influence the working life of a combustion engine. With the help of continuous measuring, misfiring can be detected and action be taken to ensure proper functioning is regained.

Devices for measuring the pressure in a combustion engine are placed in a very severe environment with high pressures of several hundred bars and temperatures of up to and over 1000° C. Continuous measurement to determine the pressure during every working cycle in the combustion engine places heavy demands on the dynamic response of the pressure sensor to rapid processes.

In the prior art, devices for measuring the gas pressure in a cylinder in a combustion engine, by means of a force sensor, which measures the force exerted by the gas on a flexible membrane, are known. Such a device is, for example, described in U.S. Pat. No. 4,408,496. This document shows a device that has a tube-shaped channel, one end of which is connected to, and open to the cylinder and the other end is closed. The closed end of the tube channel includes a flexible membrane against which the gas pressure of the cylinder is to exert an effect. The gas pressure is transferred from the membrane to a force measuring unit via a force transferring means. The force transferring means is so shaped that the force from the gas pressure, which influences the membrane, is converted to a tension in the force measuring unit.

A problem in connection with measurement of the gas pressure in a combustion engine is that large temperature changes, due to short pulses during compression and fuel burning in the cylinder, form a source of error. If the pressure sensor, which measures the force due to gas pressure, also measures the force due to temperature changes, the measurement will contain an error.

A solution to this problem is disclosed in the international patent application WO99/58945. This document shows a pressure sensor for measurement of gas pressure in a cylinder of a combustion engine, where the pressure sensor comprises a tube which consists of a section connected to the cylinder, a measuring section and a final section, the end of which is closed. The measuring section has a cross section of an hourglass shape consisting of two circular shaped parts connected to each other via a waist, which forms two parallel measuring surfaces. Externally the tube is in contact with two solid beams on either side of the measuring surfaces, which transfer pressure in the cavity to force measuring means. The tube is shaped in such a way that movements in the walls of the tube can be used for the determination of the pressure instead of using the pressure against the closed end of the tube. It is possible to make the walls of the tube weaker, i.e. walls are thinner, than the membrane at the end of the tube. This means that the additional force during measuring due to increase in temperature is reduced. This pressure sensor is useful for 2-stroke diesel engines and for slow 4-stroke diesel engines.

However, the development of diesel engines has lead to engines with higher pressure and revolutions, such as fast 4-stroke diesel engines. The energy flow from the measured gas through the sensor will generate high temperature and stresses. Thus, for those engines the thermal problem has increased.

SUMMARY OF THE INVENTION

The object of the present invention is to provide an improved device for measuring the pressure in a gas, which further alleviates the above-mentioned problem due to large temperature changes during measuring.

According to the invention this object is achieved by a device as specified in claim 1. Such a device comprises: a framework, a channel extending through the framework, the channel comprising in the axial direction an introductory section including an opening for receiving the gas, a measuring section having a wall, and a final section, the end of which is closed during measuring, a measuring unit for measuring radial forces acting on the wall of the measuring section, the measuring unit comprising a measuring body standing in mechanical contact with a first portion of the wall of the measuring section, a cooling body for transporting heat from the walls of the measuring section to the framework, wherein the cooling body is standing in thermal contact with a second portion of the wall of the measuring section and with the framework. By the term "thermal contact" is meant that the parts being in thermal contact with each other are either in direct contact with each other or that thermally conducting material is provided between them.

Heat from the walls of the measuring section is transported to the framework via the cooling body. Thereby the thermal flow from the surface exposed by the gas is increased, and a more even thermal distribution in the measuring section is achieved. A consequence of the reduced temperature changes is that the thermal expansion of the wall in the measuring section is reduced. Thus, measuring error due to changes in temperature is reduced. Another advantage compared with existing pressure measuring devices is the possibility of cooling the wall of the measuring section without increasing the stiffness of wall. Better control of the temperature of the wall makes it possible to increase the stiffness of the measuring device. The invention makes it possible to increase the stiffness and thermal flow in the measuring device without increasing the stresses in the device.

If the cooling body and the measuring body are in contact with each other there is a risk that the cooling body will disturb the measuring. Thus, to avoid that the cooling body influences the measurement, the cooling body should be separated from the measuring body at least in the measuring section. Thus, the second portion should be located at a distance from the first portion.

According to an embodiment of the invention the measuring body is standing in thermal contact with the framework. Thereby the measuring body also functions as a cooling body and the thermal flow from the surface is further increased, and thus the cooling of the walls of the measuring section is further improved.

According to an embodiment of the invention the measuring unit comprises a second measuring body standing in mechanical contact with a third portion of the wall of the measuring section, wherein the first and third portions are located essentially on opposite sides of a longitudinal axis extending through the center of the channel. With two symmetrically arranged measuring bodies it is possible to make two symmetrical measurements and add the measure signals to provide an increased signal level and a decreased noise level.

According to an embodiment of the invention the cooling body is standing in thermal contact with a fourth portion of the measuring section, wherein the second and fourth portions of the measuring section are located essentially on opposite sides of a longitudinal axis extending through the center of the channel. Thereby the cooling of the walls of the measuring section is further improved.

According to an embodiment of the invention the two measuring bodies and two cooling bodies are arranged such that a line passing through the first and third portions is essentially perpendicular to a line passing through the second and fourth portions. Thereby an even cooling of the walls of the measuring section is achieved. Another advantage achieved with this location of the bodies is that it prevents the cooling bodies from interfering with the measuring bodies.

According to an embodiment of the invention the measuring section has a cross section shaped as a dog bone having a first pair of inwardly-bent portions located opposite each other and a second pair of inwardly-bent portions located opposite each other. The first pair of inwardly-bent portions comprises the first and third portions, and the second pair comprises the second and fourth portions. This shape is advantageous since it increases the free length, i.e. the diameter, of the channel, which makes the wall of the channel weaker, which means that less force is needed to hold against the wall, which leads to less disturbances from the thermal expansion of the wall, and thus to fewer errors in the measurement.

According to an embodiment of the invention the measuring body comprises a protruding portion corresponding to the inwardly-bent first portion, and the protruding portion of the measuring body and the inwardly bent first portion of the measuring section are standing in mechanical contact with each other. The cooling body comprises a protruding portion corresponding to the inwardly-bent second portion, and the protruding portion of the cooling body and the inwardly-bent second portion of the measuring section are standing in thermal contact with each other.

According to an embodiment of the invention the measuring unit comprises a sensor adapted to measure forces in the measuring body. Examples of forces measured are shear forces, tensile forces, or compressive forces. For instance, the sensor is a magnetoelastic sensor, a piezoelectric sensor, or a strain gauge.

According to an embodiment of the invention the sensor is adapted to measure transversal shear forces in the measuring body. This embodiment allows axial movement of the measuring body without disturbing the measurement.

According to an embodiment of the invention the engine comprises an engine block and the framework is arranged for being mounted in thermal contact with the engine block. Heat from the cooling body and the measuring body is led to the engine block via the framework. The engine block traditionally comprises a cooling system and is thus suitable to take care of the heat transported to it. The cooling of the measuring section is thus further improved.

According to an embodiment of the invention the device comprises a cover member having an opening for receiving the measuring body, the cooling body, and the measuring section, and the cover member comprises a solid cooling beam adapted to be in thermal contact with the cooling body and the framework. Heat from the cover member is led to the framework via the cooling beam. Thus, the cooling of the measuring device is further improved.

The invention is particularly suitable for measuring gas pressure in diesel engines. A measuring device according to the invention makes it possible to measure 2-stroke diesel engines as well as fast 4-stoke diesel engines.

The term comprises/comprising when used in this specification is taken to specify the presence of stated features or components. However, the term does not preclude the presence or addition of one or more additional features, integers, steps or components or groups thereof.

BRIEF DESCRIPTION OF THE DRAWINGS

The invention will now be explained more closely by the description of one embodiment of the invention and with reference to the appended figures.

DETAILED DESCRIPTION OF THE INVENTION

Figure 1:
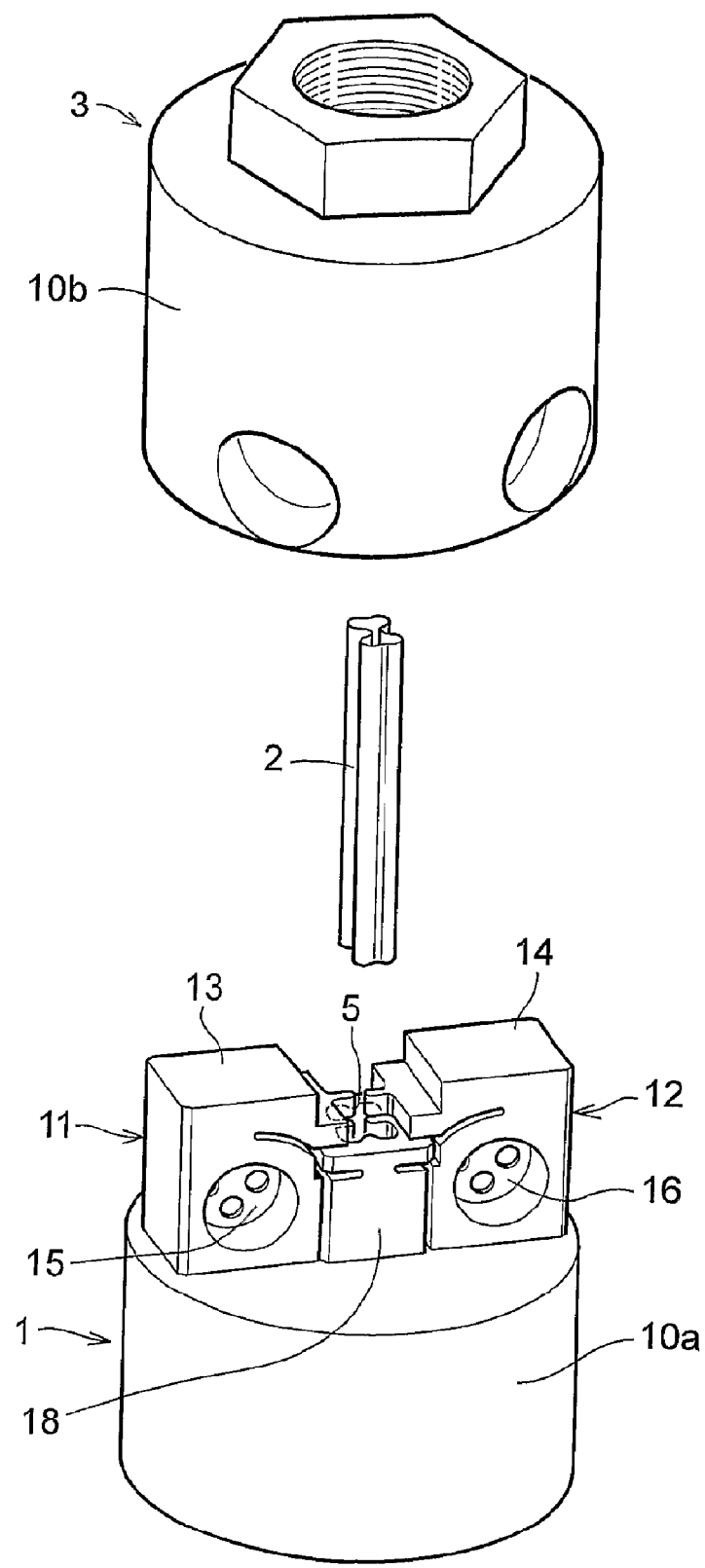
FIG. 1 shows an exploded view of a device for measuring the pressure in a gas according to an embodiment of the invention.
Figure 2:
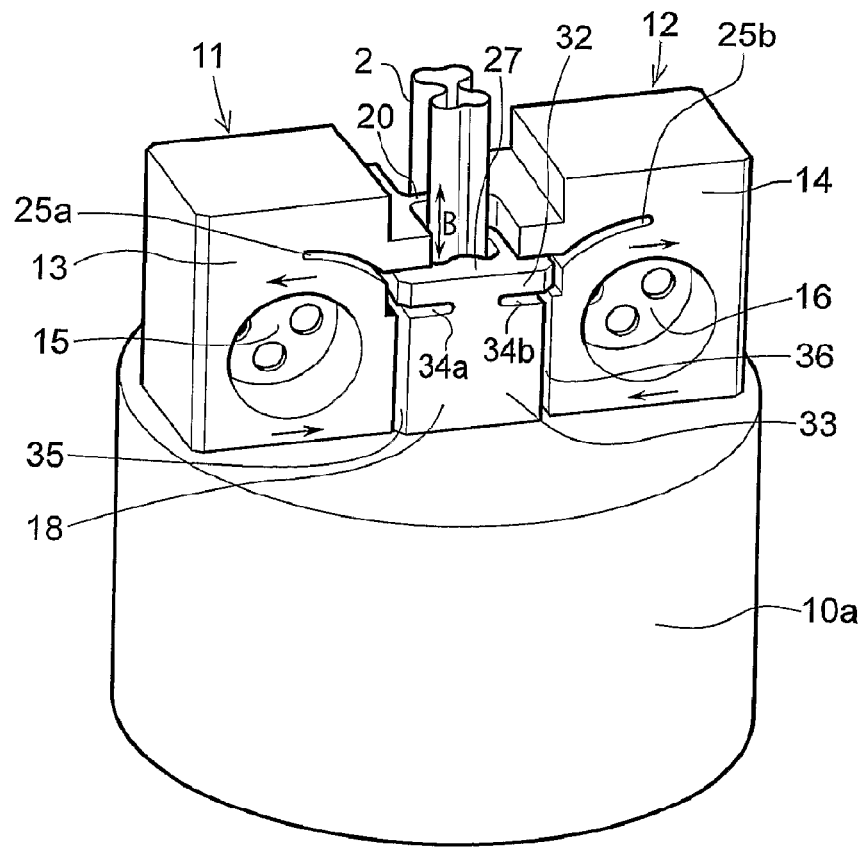
FIG. 2 shows a front elevational view of the device shown in FIG. 1, when it is partly assembled.
Figure 3:
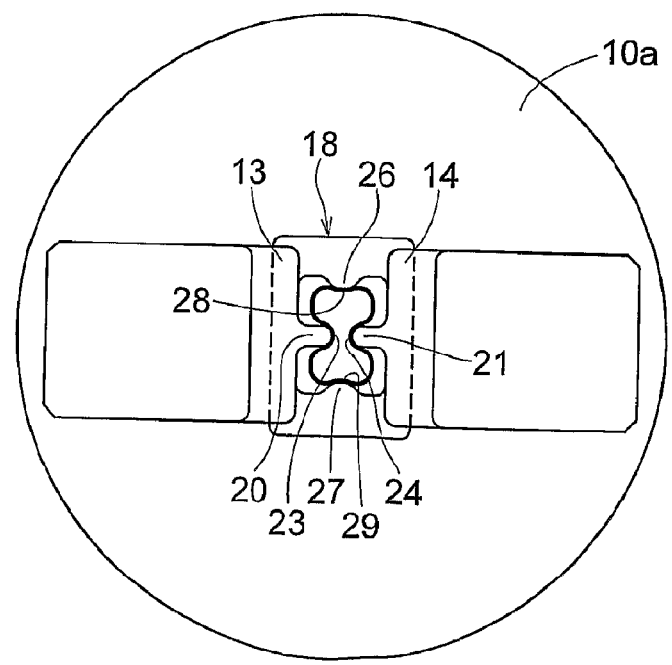
FIG. 3 shows the partly assembled device in FIG. 2 in a view from above.

FIGS. 1, 2, 3 show a device for measuring the pressure in a gas according to an embodiment of the invention. The device comprises a bottom part 1 adapted to be connected to a cylinder of a combustion engine, the gas pressure of which is to be measured, a tube 2 extending in a longitudinal direction and shaped in such a way that movement in the wall of the tube can be used for determining the pressure in the tube, and an upper part 3 which functions as a cover for the device. FIG. 2 shows the tube 2 and the bottom part 1 in an assembled state. The bottom part 1 comprises an opening 5 extending through the bottom part 1. One end of the opening 5 is adapted to receive the tube 2 and the other end of the opening 5 is adapted to be connected to the cylinder of the engine. The upper part 3 also comprises an opening 7 (shown in FIG. 5) extending through the upper part. One end of the opening is adapted to receive the tube 2 and the other end of the opening is adapted to be connected to a valve. During measuring the valve has to be shut.

Figure 4:
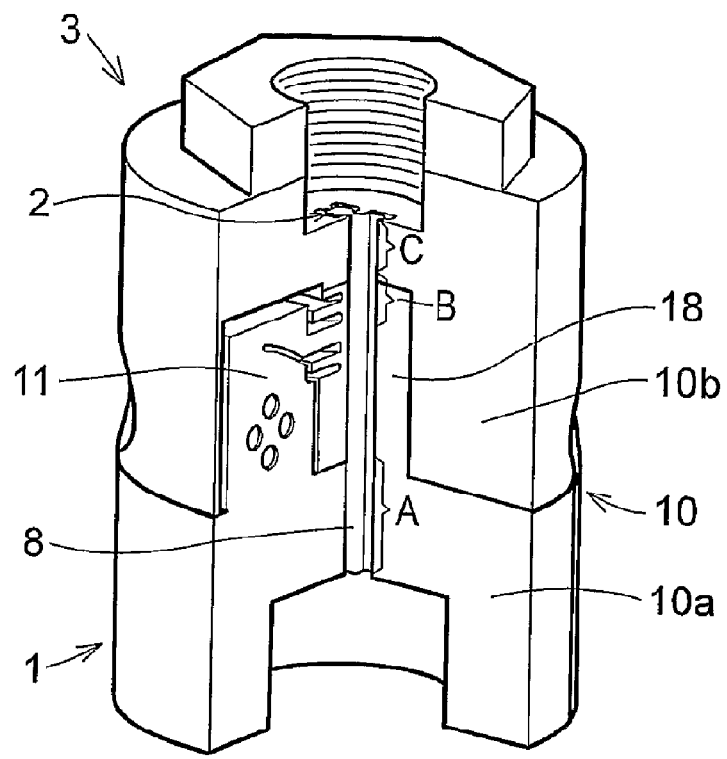
FIG. 4 shows the device in FIG. 1 when it is assembled in a view with a part cut away.

FIG. 4 shows the device when it is assembled. The opening 5 of the bottom part 1, the tube 2, and the opening 7 through the upper part 3 form a channel 8 extending through the device, as shown in FIG. 4. The upper part 3 and the bottom part 1 are, for example, soldered together. The channel 8 comprises in the axel direction an introductory section A, including an inlet for receiving the gas from the cylinder, a measuring section B, where the measuring of the gas pressure takes place, and a final section C, the end of which is closed during measuring. Note that the tube 2 does not need to have the same length as the channel. In this embodiment the length of the tube 2 is slightly shorter than the length of the channel in order to simplify mounting of the assembly. The ends of the tube are soldered to the walls in the bottom and upper part.

As shown in FIG. 4, the tube 2 is extending through a framework 10. In order to facilitate mounting of the device, the framework 10 is divided into a first and a second framework part 10a, 10b. Preferably, the framework 10 extends along the entire length of the tube 2. The first and second parts of the framework are standing in thermal contact with each other. Preferably, the framework parts 10a-b are soldered together. The framework is made of a thermally conducting material, such as steel. The important property of the material of the framework 10a-b is that it is a good conductor of heat.

The bottom part 1 comprises a cylindrically shaped framework part 10a. The bottom part 1 further comprises two measuring units 11,12 for measuring radial forces acting on the wall of the measuring section B of the tube. Each of the measuring units 11, 12 comprises a measuring body 13, 14 standing in mechanical contact with the outside of the wall of the measuring section B, and a sensor 15, 16 adapted to measure shear forces in the measuring body. The sensor is, for example, a magnetoelastic sensor. The principle for the sensors used in this embodiment is, for example, described in Swedish patent number 151267. However, in another embodiment of the invention it is possible to use other types of force sensors, for example, a strain gauge or a piezoelectric sensor.

The bottom part 1 further comprises a cooling body 18 adapted to transport heat from the wall of the tube 2 to the framework parts 10a-b. The cooling body should also be made of a material which is a good heat conductor, for example, of steel. The cooling body should be mounted in thermal contact with the measuring section and with the framework parts 10a-b, in order to conduct heat from the wall of the measuring section of the tube to the framework 10a-b. In this embodiment, as shown in FIG. 4, the cooling body 18 is mounted in mechanical contact with the measuring section and with the framework parts 10a-b.

FIG. 3 shows the partly assembled device in FIG. 2 in a view from above. As seen from FIG. 3, the tube 2 has a dog bone shaped cross section having a first pair of inwardly-bent portions 23, 24 located opposite each other and a second pair of inwardly-bent portions 28,29 located opposite each other. The protruding portions 20, 21 of the measuring body are standing in mechanical contact with the inwardly-bent portions 23,24 of the wall. The protruding portions 26, 27 of the cooling body are standing in thermal contact with the inwardly-bent portions 28, 29 of the wall.

The first measuring body 13 comprises the protruding portion 20 standing in mechanical contact with the portion 23 of the wall of the measuring section. The second measuring body 14 comprises the protruding portion 21 standing in mechanical contact with the portion 24 of the wall of the measuring section. The portions 20, 21 of the wall of the measuring section are located essentially on opposite sides of the channel 8. The measuring bodies 13,14 are standing in thermal and mechanical contact with the framework 10a-b. Thus, heat is transported from the portions 20, 21 of the wall to the framework and thereby the measuring bodies also have the function of cooling the wall of the measuring section. The measuring bodies 15, 16 are preferably made of a thermally conducting material, for example, of metal such as steel.

The cooling body 18 comprises the first protruding portion 26, standing in thermal contact with the portion 28 of the wall of the measuring section. The cooling body 18 further comprises the second protruding portion 27 standing in thermal contact with the portion 29 of the wall of the measuring section. The portions 28, 29 of the wall of the measuring section are located essentially on opposite sides of the channel 8. The measuring bodies 13, 14 are arranged such that a line passing through the portions 23,24 of the wall is essentially perpendicular to a line passing through the portions 28,29 of the wall.

In this embodiment the cooling body 18 is a solid piece of metal provided with a through hole for receiving the tube 2. However in another embodiment of the invention the cooling body may comprise two parts, a first part comprising the first protruding portion 26 and a second part comprising the second protruding portion 27. The cooling body 18 transfers heat from the wall of the measuring section to the framework 10a-b. As shown in FIG. 2, the cooling body 18 is provided with an upper part 32, which is made weaker than a lower part 33 of the cooling body by means of two slits 34a-b provided on each side of the cooling body. Each slits 34a-b extends through a part of the cooling body. The upper weaker part 32 takes care of stresses in the material in the cooling body arising from fast temperature changes.

In this embodiment the cooling body 18 is shaped such that is surrounds the tube 2. To avoid disturbances on the measurement, the cooling body and the measuring bodies should preferably not be allowed to have contact with each other close to the measuring section. Therefore elongated slots 35, 36 (shown in FIG. 2), extending in the direction of the tube, are provided between the cooling body 18 and the measuring bodies 13, 14.

The profile of the measuring section can also be described with four positive and four negative radii. The negative radius gives a weakness that is supported by the measuring bodies. Two of the parts with negative radius are used for force measuring. The other two have thermal contact with the framework and are used for cooling. The two cooling bodies are placed in a symmetry plane and will therefore not interfere in the measuring.

The wall of the tube 2 is made rather weak in order to enable measuring of the pressure on the wall. The tube 2 is preferably made of metal, for example, steel. The thickness of the wall is preferably less than 1 mm, for example, in the interval 0.1-0.8 mm, to provide a wall weak enough to enable pressure measuring. Thus, the wall of the measuring section is weak and the measuring body is stiff. The pressure inside the measuring section is measured by measuring the force through the measuring body 13, 14. In this embodiment shear forces in the measuring bodies are measured. In FIG. 2 arrows show the shear forces in the measuring bodies 13, 14. Each of the measuring bodies 13, 14 is provided with a slit 25a, 25b, which are shown in FIG. 2. The slits 25a-b allow axial stresses and movements in the measuring body and thus reduce stresses in the measuring bodies. The measuring units 11, 12 are symmetrically arranged relative to the measuring section B of the tube. The output signals from the sensors 15, 16 are added to provide a stronger signal and to reduce noise in the signal.

Figure 5:
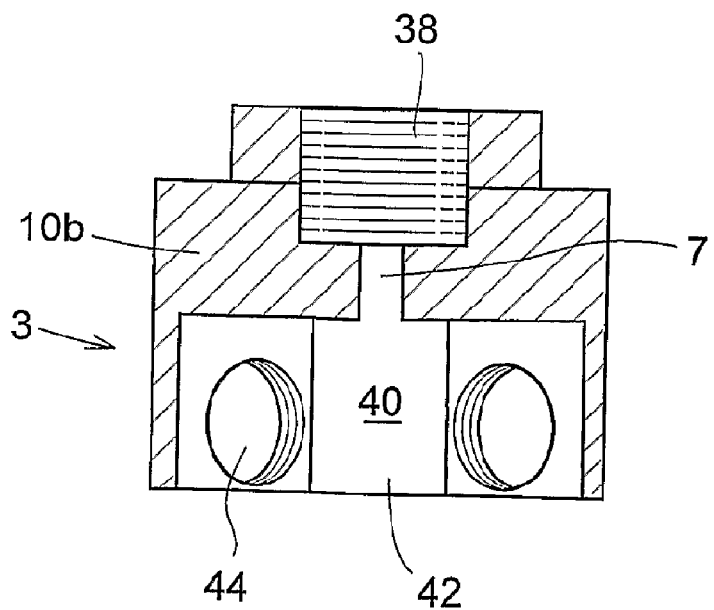
FIG. 5 shows a cross section through an upper part of the device shown in FIGS. 1-4.

FIG. 5 shows the upper part 3 of the device comprising the second framework part 10b. One end of the framework part 10b comprises a threaded hole 38 designed to receive a valve for closing the upper end of the channel 8 during measuring. The framework part 10b has a cylindrical shape. In its other end, the framework part 10b is provided with a cavity 40 designed to receive the measuring bodies 13, 14, the cooling body 18, and the tube 2. This end of the framework part 10b is adapted to be connected to the first framework part 10a and to stand in thermal and mechanical contact therewith. The second framework part 10b is also provided with two solid cooling beams 42 (only one is shown in FIG. 5) located on opposite sides of the cavity 40. The cooling beams 42 are adapted to be in mechanical and thermal contact with the cooling body 18 and with the first framework part 10a, in order to transport heat from the cooling body to the first framework part. When the upper part 3 and the bottom part 1 are assembled, the cooling beams are bearing on the first framework part 10a.

In this embodiment the bottom part 1 is made in one piece and the upper part is also made in one piece. The upper part 3 is provided with a plurality of openings 44, which are used when assembling the device to facilitate the soldering.

Figure 6:
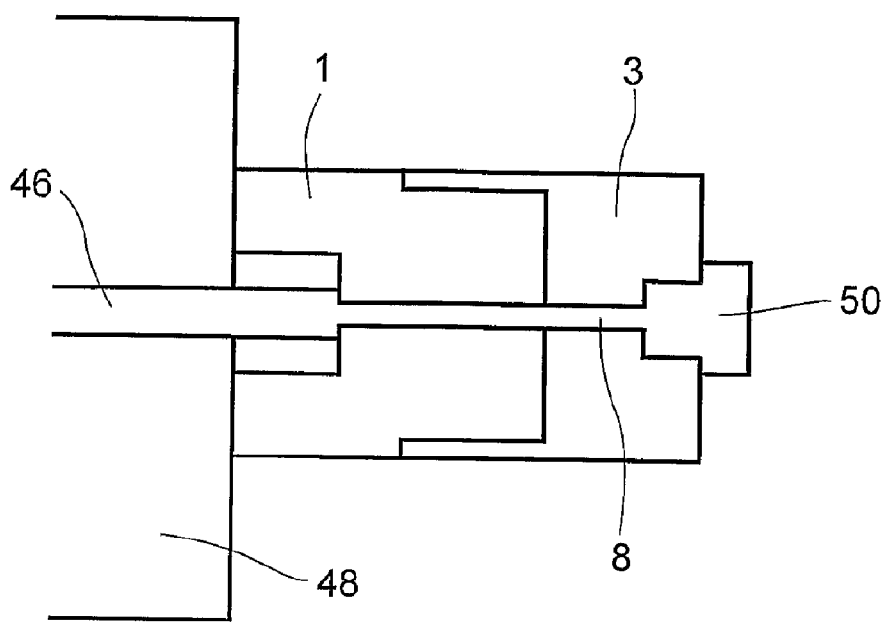
FIG. 6 shows the device shown in FIGS. 1-5 mounted in an engine.

FIG. 6 shows the device described above, mounted in a combustion engine. The channel 8 of the device is connected to a cylinder 46 of the engine. The end of the channel 8, which is connected to the cylinder, is open in order to allow gas from the cylinder to enter into the channel. The first framework part 10a of the device is mounted in thermal and mechanical contact with an engine block 48 in order to transfer heat from the framework 10 to the engine. The other end of the device is provided with a valve 50.

Figure 7A:
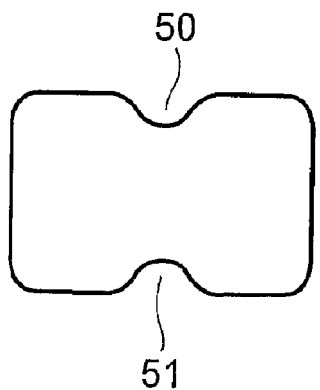
FIGS. 7a-b show sections through two different embodiments of the measuring section.
Figure 7B:
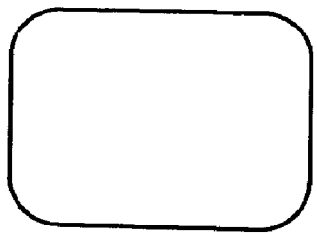

The present invention is not limited to the embodiments disclosed but may be varied and modified within the scope of the following claims. For example, the cross section of the measuring section does not necessarily have to be dog bone shaped; it is, for example, possible to use a measuring section with an hour-glass shape, as shown in FIG. 7, having two inwardly-bent portions 50,51 located opposite each other to be used for measuring. The cooling bodies are then arranged on the two other opposite sides, which both are essentially plane. Another possibility is shown in FIG. 7b, wherein the measuring section has an essentially rectangular shape.

What is claimed is:

1. A device for measuring the pressure in a gas, wherein the device comprises:
   a framework,
   a channel extending through the framework, the channel comprising in the axial direction an introductory section including an opening for receiving the gas, a measuring section having a wall, and a final section, the end of which is closed during measuring,
   a measuring unit for measuring radial forces acting on the wall of the measuring section, the measuring unit comprising a measuring body standing in mechanical contact with a first portion of the wall of the measuring section, characterized in that the device further comprises a cooling body for transporting heat from the walls of the measuring section to the framework, wherein the cooling body is standing in thermal contact with a second portion of the wall of the measuring section and with the framework.

2. The device according to claim 1, wherein the measuring body is standing in thermal contact with the framework.

3. The device according to claim 1, wherein the measuring unit comprises a second measuring body standing in mechanical contact with a third portion of the wall of the measuring section, wherein the first and third portions are located essentially on opposite sides of a longitudinal axis extending through the center of the channel.

4. The device according to claim 3, wherein the cooling body is standing in thermal contact with a fourth portion of the measuring section, wherein the second and fourth portions of the measuring section are located essentially on opposite sides of a longitudinal axis extending through the center of the channel.

5. The device according to claim 4, wherein said measuring and cooling bodies are arranged such that a line passing through the first and third portions are essentially perpendicular to a line passing through the second and fourth portions.

6. The device according to claim 4, wherein said measuring section has a cross section shaped as a dog bone having a first pair of inwardly-bent portions located on opposite sides of the channel and a second pair of inwardly-bent portions on opposite sides of the channel.

7. The device according to claim 6, wherein said first pair of inwardly-bent portions comprises said first and third portions, and said second pair of inwardly-bent portions comprises said second and fourth portion.

8. The device according to claim 7, wherein the first measuring body comprises a protruding portion corresponding to said first portion, and the second measuring body comprises a protruding portion corresponding to said third portion, and the protruding portions of the measuring bodies are in mechanical contact with said first pair inwardly-bent portions of the measuring section.

9. The device according to claim 7, wherein the cooling body comprises a first and a second protruding portion corresponding to said second and fourth portions, and the protruding portions of the cooling body and said second pair of inwardly-bent portion of the measuring section are standing in thermal contact with each other.

10. The device according to claim 1, wherein the measuring unit comprises a sensor adapted to measure forces in the measuring body.

11. The device according to claim 10, wherein the sensor is a magneto elastic sensor.

12. The device according to claim 10, wherein the sensor is a piezoelectric sensor.

13. The device according to claim 10, wherein the sensor is a strain gauge.

14. The device according to claim 1, wherein the device is adapted for measuring the gas pressure in a cylinder of a combustion engine.

15. The device according to claim 14, wherein the engine comprises an engine block and the framework is arranged for being mounted in thermal contact with the engine block.

16. The device according to claim 1, wherein the device comprises a bottom part including said framework, said measuring unit, said cooling body and said introductory section of the channel, and an upper part including said final section of the channel and a cavity for receiving the measuring body, the cooling body, and the measuring section, wherein the bottom and upper part are adapted to fit together.

17. The device according to claim 16, wherein the upper part comprises a cooling beam adapted for being in thermal contact with the cooling body and the framework when the upper and bottom parts are assembled.

18. The device according to claim 2, wherein the measuring unit comprises a second measuring body standing in mechanical contact with a third portion of the wall of the measuring section, wherein the first and third portions are located essentially on opposite sides of a longitudinal axis extending through the center of the channel.

19. The device according to claim 8, wherein the cooling body comprises a first and a second protruding portion corresponding to said second and fourth portions, and the protruding portions of the cooling body and said second pair of inwardly-bent portion of the measuring section are standing in thermal contact with each other.

20. A method for measuring the pressure in a gas, comprising the steps of:
- providing a device that comprises:
  - a framework,
  - a channel extending through the framework, the channel comprising in the axial direction an introductory section including an opening for receiving the gas, a measuring section having a wall, and a final section, the end of which is closed during measuring,
  - a measuring unit comprising a measuring body standing in mechanical contact with a first portion of the wall of the measuring section, characterized in that the device further comprises a cooling body standing in thermal contact with a second portion of the wall of the measuring section and with the framework;
- measuring radial forces acting on the wall of the measuring section using the measuring unit; and
- transporting heat from the walls of the measuring section to the framework using the cooling body.

21. The method of claim 20, wherein the method is used for measuring the pressure in a cylinder in a diesel engine.

* * * * *